(12) United States Patent
Karkow et al.

(10) Patent No.: US 8,286,912 B2
(45) Date of Patent: *Oct. 16, 2012

(54) WINGTIP AND SPONSON INTERACTION ON AN AMPHIBIOUS AIRCRAFT

(75) Inventors: Jon Karkow, Tehachapi, CA (US); Krik Hawkins, Los Angeles, CA (US); Matthew Gionta, Tehachapi, CA (US); Steen Strand, Los Angeles, CA (US)

(73) Assignee: Icon Aircraft, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,150

(22) Filed: Feb. 13, 2012

(65) Prior Publication Data

US 2012/0187242 A1 Jul. 26, 2012

Related U.S. Application Data

(63) Continuation of application No. 12/482,336, filed on Jun. 10, 2009, now Pat. No. 8,177,162.

(51) Int. Cl.
*B64C 35/00* (2006.01)
(52) U.S. Cl. ...................................................... 244/105
(58) Field of Classification Search .............. 244/2, 105, 244/106, 111, 199.4
See application file for complete search history.

*Primary Examiner* — Timothy D Collins
*Assistant Examiner* — Nicholas McFall
(74) *Attorney, Agent, or Firm* — Martensen IP; Michael C. Martensen

(57) ABSTRACT

A system for enhanced lateral stability of an amphibious aircraft includes a buoyancy system laterally displaced from opposite sides of the fuselage of the aircraft and wingtip system having a hydrodynamic planing surface associated with each wingtip. The hydrodynamic planing surface on each wingtip prevents the submersion of an associated buoyancy structure. By supplementing the lateral stability of the buoyancy structures using hydrodynamic planing surfaces, the combined lateral width of the fuselage and buoyancy structures can be reduced without detrimentally impacting operational performance. This reduced lateral width enables the amphibious aircraft to be configured for storage and transportation on a trailer or shipping container.

29 Claims, 4 Drawing Sheets

WINGTIP AND SPONSON INTERACTION ON AN AMPHIBIOUS AIRCRAFT

RELATED APPLICATION

The present application is a continuation of, relates to, and claims the benefit of priority to U.S. patent application Ser. No. 12/482,336 filed Jun. 10, 2009, which is hereby incorporated by reference in its entirety for all purposes as if fully set forth herein.

BACKGROUND OF THE INVENTION

1. Field of the Invention

Embodiments of the present invention relate, in general, to amphibious aircraft and more particularly to the interaction between a sponson and wingtip of an amphibious aircraft.

2. Relevant Background

An amphibious aircraft is an aircraft that can operate on both land and water.

While on land landing gear extending from the fuselage of the aircraft or similar structure allow the aircraft to operate as a conventional land-based aircraft. When operating in the water amphibious aircraft generally fall into two categories: 1) float-planes and 2) hull-type planes. In float-planes, a conventional aircraft is mounted on two external floats, otherwise known as pontoons. When operating in water only the pontoons or external floats reside in the water. In a hull-type aircraft the actual aircraft fuselage is designed to rest in the water without the need of floats and acts much like a boat with respect to water functionality.

Each type of amphibious aircraft has disadvantages. One disadvantage of float-plane type amphibians is the large amount of increased aerodynamic and hydrodynamic drag. Another is the substantial weight caused by the floats and mounting structures. Increased drag and weight generally result in decreased performance. In hull-type amphibians one disadvantage is entry to and exit from the aircraft. As the hull sits in the water, entry and exit usually occurs from the water or from a special dock built to accept these types of seaplanes. This can be a significant disadvantage as it may severely limit the aircraft's utility. Additionally, hull-type amphibians require buoyancy devices for lateral stability on the water as the center of buoyancy of the aircraft resides directly below the center of gravity; an unstable condition. These supplemental lateral stability devices are generally called sponsons and are typically mounted under each wing. The presence of the sponsons make docking and handling of a hull-type amphibian more difficult during water operations and increase drag during flight. Another disadvantage of a hull-type amphibian is that, unlike a float-plane where the operator can stand outside the aircraft on the floats, an operator of a hull-type amphibian has little area to stand to aid in maneuvering the aircraft while the aircraft is in the water. For example, it is common for a pilot of a float-plane to exit the aircraft and stand on one of the floats during water operations and use a paddle to maneuver the aircraft to a dock.

Sponsons of a float-plane provide supplemental buoyancy during water operations. During taxiing, landing and takeoff the sponsons and hull both experience what is called hydrodynamic hull drag. The trailing edge of the sponsons and hull act as a rear edge of a planing hull forming a hydrodynamic step. As is well known to one skilled in the relevant art, the use of a planing hull reduces the hydrodynamic hull drag at higher speeds because there is no trailing hull portion to generate negative pressure. A curved trailing hull is used for displacement type hulls to reduce negative pressure. But in a planing hull negative pressure can be substantially eliminated. Although pressure in a planing hull is primarily upward such that the hull rises higher and higher as speed increases, the majority of the hydrodynamic drag still occurs at the rear edge. The magnitude of this effect depends on whether the rear or aft portion of the hull is essentially flat. If the hull curves upward, a low pressure region is created thus increasing drag. If the hull curves downward, additional work is required to converge the water stream and there is excess churning of water which also creates drag.

Thus in a planing boat hull a hydrodynamic step is often formed by two surfaces meeting at approximately right angles. These surfaces are often the transom, which is almost vertical, and the planing surface bottom of the hull, which is generally horizontal at the rear of the boat. In an aircraft a vertical rear surface formed with a 90 degree angle is avoided because of increased aerodynamic resistance. Aerodynamic drag is negligible in a boat, however the drag caused by a vertical surface in an aircraft resulting in separated airflow can be substantial. Accordingly, a compromise must be reached between minimization of hydrodynamic drag during water operations and minimization of aerodynamic drag during flight operations.

Sponsons also provide lateral stability when the aircraft is at rest. However as an aircraft turns centrifugal forces roll the aircraft away from the direction of turn. The rolling motion, which is initially inhibited by the sponson, may cause the sponson, to become submerged if the speed of the turn and induced forces are significant. If the sponson becomes submerged drag significantly increases pulling the aircraft in the opposite direction thus rendering the turn impossible. As a result the aircraft must come to a stop, allowing the sponson to resurface so that the turn can continue or be reinitiated.

A challenge exists in the prior art for a configuration of a hull type amphibian possessing sponsons that can conduct a coordinated turn during water operations without significantly impacting the aircraft aerodynamic performance while airborne. A challenge also exists for sponson configured amphibious aircraft to turn at moderate speeds without submerging their sponsons. These and other challenges of the prior art are overcome by the present invention, which is hereafter described by way of example.

SUMMARY OF THE INVENTION

A system for enhanced lateral stability of an amphibious aircraft is hereafter disclosed; it includes a buoyancy system laterally displaced from the fuselage of the aircraft combined with a wingtip system having an associated hydrodynamic planing surface. According to one embodiment of the present invention, a hydrodynamic planing surface on each wingtip prevents the submersion of a buoyancy structure associated with each side of the aircraft.

The buoyancy system of the present invention includes a buoyancy structure extending laterally from each side to the fuselage to enhance the lateral stability of the aircraft. To supplement this lateral stability a buoyant wingtip system or structure is incorporated into each wingtip. Each wingtip includes a statically buoyant structure as well as a planing surface that, when striking the water when the aircraft is in motion, produces a righting force that prevents further increase in lateral displacement of the aircraft and resulting submersion of the buoyancy structure.

The combination of the wingtip system and lateral buoyancy system enables an amphibious aircraft to be configured so as to be legally transported on a road using a trailer. According to one embodiment the maximum width of the trailer housing an amphibious aircraft implementing the lateral stability system of the present invention is less than or equal to 9 feet. According to another embodiment of the present invention, the width of the amphibious aircraft in its storage configuration with the lateral stability system is less than 7 feet, 6 inches.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

A lateral stability system comprising a buoyancy system and a wingtip system associated with an amphibious aircraft is hereafter described by way of example. As is well known in the prior art, seaplanes or aircraft in which the fuselage acts as a waterborne vessel when in the water possess little lateral stability. To enhance the lateral stability of such waterborne aircraft, sponsons or floats are laterally displaced from the centerline of the fuselage. Such sponsons provide adequate lateral stability when the aircraft is at rest. However, when the aircraft is in motion and interacts with the environment, the lateral stability offered by the sponsons can be diminished. To counter this diminishing effect the lateral displacement of the sponsons from the centerline of the aircraft is increased. Indeed the maximal effect for the sponsons occurs when they are displaced near the wingtip themselves, as is evident in some of the early designs of waterborne aircraft.

According to one embodiment of the present invention, a buoyancy system is blended with the fuselage of the amphibious aircraft to provide adequate static lateral stability without detrimentally impacting aerodynamic performance. To supplement the lateral stability offered by the buoyancy system a wingtip system is oppositely incorporated into the end of each wingtip. Each wingtip system includes a hydrodynamic planing surface which, when contacting the surface of the water while the amphibious aircraft is in motion, produces a righting force to supplement the lateral stability offered by the buoyancy system. The righting force is substantially perpendicular to a plane defined by the surface of the water.

Figure 1:
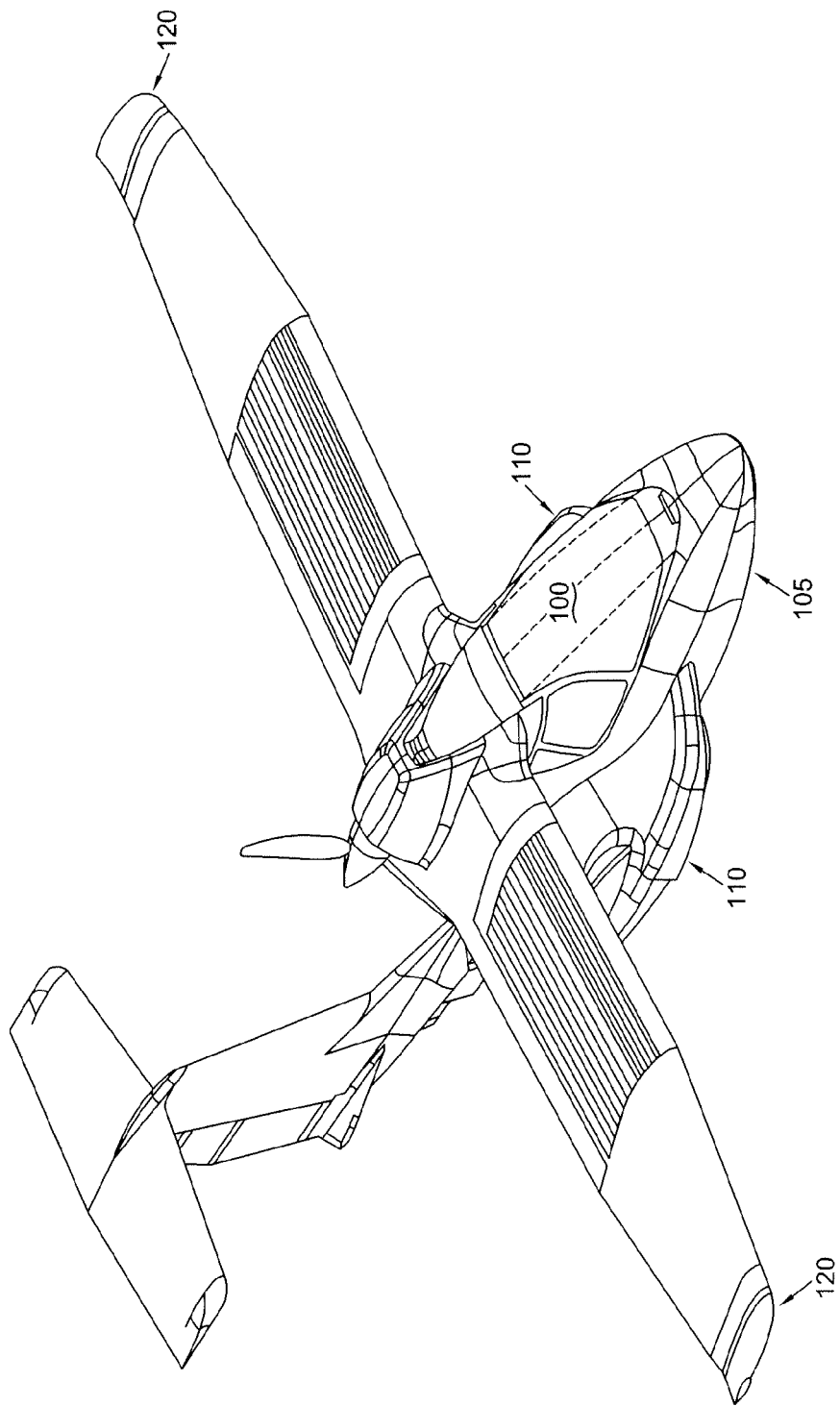
FIG. 1 shows a right front perspective drawing of an amphibious aircraft having a lateral stability system according to one embodiment of the present invention.

FIG. 1 shows a left front perspective view of an amphibious aircraft incorporating the lateral stability system of the present invention. The amphibious aircraft 100 includes the buoyancy system 110 and two wingtip systems 120 located at each wingtip and as can be seen in FIG. 1. A buoyancy system 110 includes two buoyancy structures each laterally extending from each side of the fuselage. Each structure is buoyant in nature and possesses hydrodynamic features to enhance the lateral stability of the aircraft while the aircraft is in motion on the water. Furthermore each buoyancy structure is designed to minimize negative aerodynamic effects once airborne.

The wingtip system of the present invention includes a negative dihedral (anhedral) orientated wingtip that possesses a planing surface oriented towards a surface of the water. As an aircraft rolls about its longitudinal axis due to lateral instability the wingtip in the direction of the roll makes contact with the water. In a static situation the buoyant properties of the wingtip alone will supplement the lateral stability of the buoyancy system. However as the aircraft is in motion the planing effect of the planing surface found on the lower portion of the wingtip as it makes contact with the water will produce a righting force substantially perpendicular to the surface of the water and opposite to the experienced lateral instability.

The planing surface of each wingtip is oriented such that upon first contact with the water, the leading edge of the wingtip is out of the water. This is due to a positive incidence of the wingtip. Therefore first contact of the wingtip planing surface is made with the trailing edge. As more of the planing surface makes contact with the water the roll or righting force is increased. Furthermore the increase immersion of the planing surface gives an increased righting force at an increasing rate. The positive angle of incidence of the wingtip also maintains the ability of the wingtip to provide a righting force in sea conditions having small waves.

In addition to the positive angle of incidence the trailing edge of the wingtip as viewed from the bottom of the planning surface is sharp to promote a clean separation of the water of the surface of the wingtip. Recall that rounded corners would promote a flow attachment to the radius which would create a negative pressure condition resulting in a downward lifting force.

Figure 2:
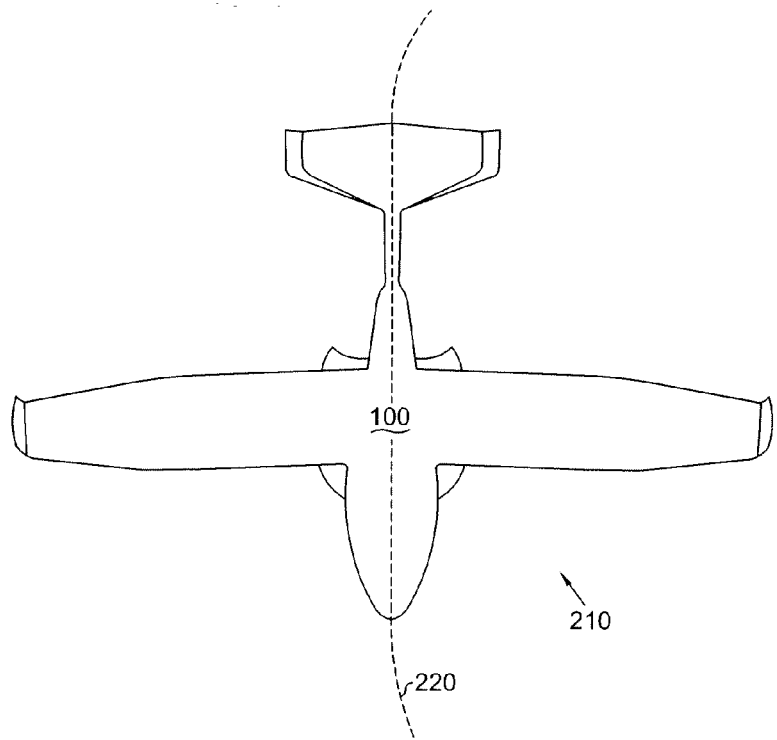
FIG. 2 shows a top view of an amphibious aircraft and a left arcing turn employing a lateral stability system according to one embodiment of the present invention.

FIG. 2 shows a top view of an amphibious aircraft in a left turn incorporating the lateral stability system of the present invention. While the aircraft 100 attempts to accomplish a left hand coordinated turn 220 the aircraft 100 also experiences a left quartering head wind 210. As the aircraft 100 turns to the left the inertia of the aircraft and centrifugal forces induced by the turn attempts to roll the aircraft to the right. Recall that turning produces an acceleration directed towards the center of the turn. This acceleration produces a force experienced in the opposite direction through the center of gravity. Also recall that the center of gravity of the amphibious aircraft rests above the surface of the water. As the aircraft 100 turns the inertia pulls the top half of the aircraft toward the outside of the turn resulting in the aircraft rolling about its center of gravity, rolling about the aircraft's longitudinal axis in a direction opposite of the direction of turn. This rolling tendency is enhanced when an amphibious aircraft in a left-hand turn experiences a left-hand quartering cross wind 210.

In the present embodiment the amphibious aircraft is designed to have a high wing structure as is typical with most amphibious aircraft. A high wing aircraft is generally dynamically stable about the aircraft's lateral axis during flight. This is because during flight aerodynamic forces experienced by the wing interact with those of the fuselage and produce a high pressure region below the wing on the inside of the turn. All things being equal this high pressure region would have the tendency to level the aircraft if control inputs were released. The combination of the high wing and fuselage provide an effective dihedral effect. The same effect occurs when an amphibious aircraft is waterborne and experiences a left quartering crosswind. Indeed operators of light high wing land-based aircraft must be cognizant of crosswind conditions to prevent the upwind wing from becoming airborne and flipping the aircraft over during taxiing operations. As the amphibious aircraft attempts to turn into the wind, the quartering crosswind interacts with the wing and fuselage underneath the upwind side of the aircraft producing a tendency to roll the aircraft away from the crosswind. At the same time the crosswind interacts with the rudder of the aircraft, which tends to weathervane the aircraft or point the aircraft into the wind and can exacerbate the situation and produce a tangential force that also rolls the aircraft away from the crosswind. The result, if left unchecked, is an uncoordinated turn to the left in a right wing low configuration.

Land-based aircraft experiencing a similar situation direct their flight controls such that the ailerons of the upwind wing experiencing the crosswind are deflected upward so as to force the wing down. This aids in controlling the lifting moment on the wing. However land-based aircraft interact with the ground via the landing gear, which provides a stable frictional surface on which to operate. The amphibious aircraft experiencing the same scenario has no such stable surface on which to rely. Rather an amphibian must enhance its lateral stability by using sponsons or some other form of laterally displaced buoyancy.

In the scenario described above for an amphibious aircraft a quartering crosswind experienced in a turn can result in the upwind wing being raised such that the opposite buoyancy structure or sponson is submerged. If the sponson on the opposite side of the turn is submerged, the hydrodynamic drag induced by the sponson will prevent the aircraft from conducting the turn. Indeed the drag may be so significant that the aircraft turns in the opposite direction. Thus in such a situation the turn must be halted such that static buoyancy is regained. Once the aircraft is leveled and lateral stability reestablished, the turn can begin anew.

While frustrating during low-speed operations, the inability to limit lateral displacement and to conduct a coordinated turn with a crosswind can severely limit the operating envelope of an amphibious aircraft and can result in dangerous takeoff and landing conditions. According to one embodiment of the present invention the hydrodynamic planing effect of the wingtip prevents the submergence of the leeward, or downwind, side sponson. As a result, lateral displacement limits are never exceeded and the operating envelope with respect to a crosswind component for the amphibious aircraft can be enhanced. As the speed of the aircraft increases, the ailerons become effective and lateral stability can be regained through aerodynamic forces from the ailerons and without use of the hydrodynamic planing surface of the wingtip.

Figure 3:
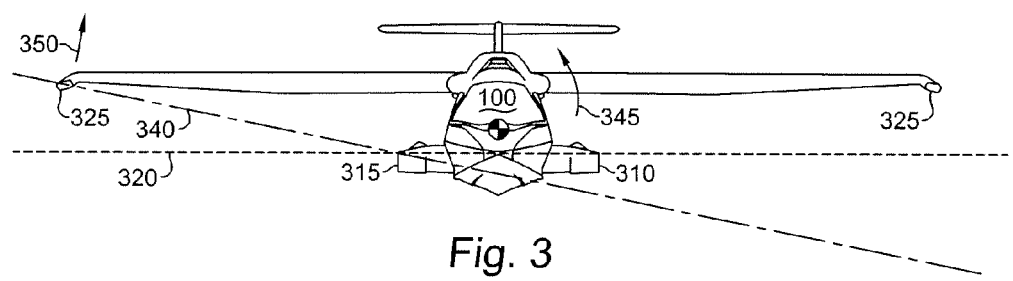
FIG. 3 shows a front view of the aircraft previously shown in FIG. 2 with two superimposed waterlines showing implementation of the stability system of the present invention.

FIG. 3 depicts a front view of an amphibious aircraft having the lateral stability system according to one embodiment of the present invention. As can be seen, the amphibious aircraft 100 includes a laterally displaced buoyancy structure 310, 315 on opposite sides of the aircraft. When the aircraft is at rest the buoyancy structures 310, 315 provide adequate lateral stability to maintain the aircraft 100 in an upright position with respect to the surface of the water 320. As the aircraft 100 experiences forward motion, as is described with respect to FIG. 2, and attempts to turn, inertia and a crosswind will exert a rolling force 345 on the aircraft 100. In this case a left front quartering crosswind produces a right rolling force. As the aircraft 100 rolls to the right the right most wingtip 325 impacts the water.

According to one embodiment of the present invention, the hydrodynamic planing surface of the right most wingtip 325 produces a righting force substantially perpendicular to the surface of the water 340. The design of the wingtip is such that the wingtip does not become submerged and retains its ability to produce a righting force as speed increases. The righting force 350 counteracts the rolling moment 345 caused by the turn and crosswind. As a result the leeward buoyancy structure 315 does not become submerged. As the speed of the aircraft increases, the planing effect of the hydrodynamic wingtip 325 and the righting force 350 increase as does the planing effect of the buoyancy structure 315 through its interaction with the water. Eventually the ailerons become effective enabling the wingtip 325 to right itself without the use of the hydrodynamic planing wingtip.

Figure 4A:
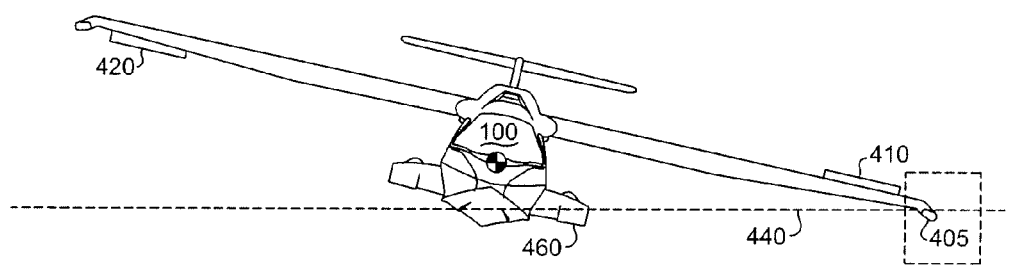
FIG. 4A shows an amphibious aircraft in a left coordinated waterborne turn using the lateral stability system according to one embodiment of the present invention.

FIG. 4A shows a front view of an amphibious aircraft with a lateral stability system of the present invention interacting with a water surface. As shown the surface of the water 440 interacts with the left hydrodynamic planing wingtip 405 of the amphibious aircraft 100. Also shown in FIG. 4 are the ailerons 410, 420 of the amphibious aircraft. In the present depiction the amphibious aircraft 100 is attempting to substantially conduct a left coordinated turn by deflecting the left wingtip 405 into the water using the ailerons 410, 420. By forcing the left wingtip 405 into the surface of the water 440 and utilizing the hydrodynamic planing effect of the present invention, the aircraft 100 substantially experiences a coordinated turn while on the water. Note that, as shown, while wingtip 405 is interacting with the water 440, its associated buoyancy structure 460 is not submerged.

The wingtip system of the present invention includes a negative dihedral (anhedral) orientated wingtip that possesses a planing surface oriented towards a surface of the water. As an aircraft rolls about its longitudinal axis due to lateral instability the wingtip in the direction of the roll makes contact with the water. In a static situation the buoyant properties of the wingtip alone will supplement the lateral stability of the buoyancy system. However as the aircraft is in motion the planing effect of the planing surface found on the lower portion of the wingtip as it makes contact with the water will produce a righting force substantially perpendicular to the surface of the water and opposite to the experienced lateral instability.

Figure 4B:
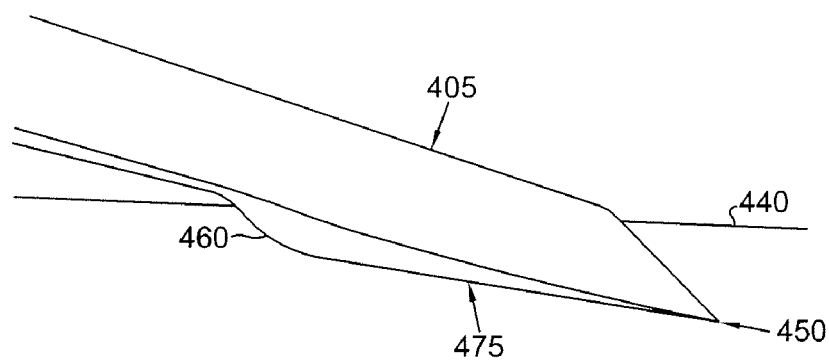
FIG. 4B is an enlarged view of interaction between the water and one of the wingtips of the lateral stability system of the amphibious aircraft shown in FIG. 4A.

FIG. 4B is an enlarged depiction of the wingtip's interaction of the surface of the water according to one embodiment of the present invention. The planing surface 475 of each wingtip 405 is orientated such that upon first contact with the water, the leading edge 460 of the wingtip is out of the water. This is due to a positive incidence of the wingtip. Therefore first contact of the wingtip planing surface 475 is made with the trailing edge 450. As more of the planing surface makes contact with the water the roll or righting force is increased. Furthermore the increase immersion of the planing surface 475 gives an increased righting force at an increasing rate. The positive angle of incidence of the wingtip also maintains the ability of the wingtip to provide a righting force in sea conditions having small waves.

Figure 4C:
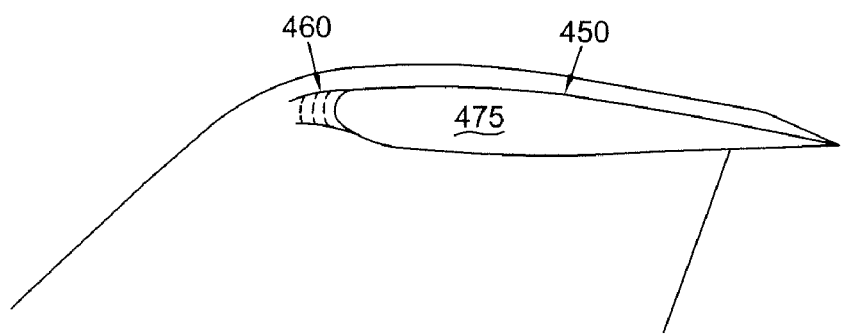
FIG. 4C is a bottom view of the wingtip planing surface of the lateral stability system of the present invention.

FIG. 4C shows the same wingtip of FIG. 4B as viewed from the bottom. In addition to the positive angle of incidence the wingtip as viewed from the bottom of the planning surface has two sharp trailing edges, one inboard and another outboard (collectively the trailing edge 450) to promote a clean separation of the water from its interaction with the surface of the wingtip. Recall that rounded corners would promote a flow attachment of a radius which would create a negative pressure condition resulting in a downward lifting force. Note that the planing surface of the wingtip is angled upward at an angle with respect to the leading edge of the wing such that upon the aircraft rolling sufficient for the wingtip (planing surface) to make contact with the water, the planing surface is substantially parallel to the surface of the water.

Figure 5:
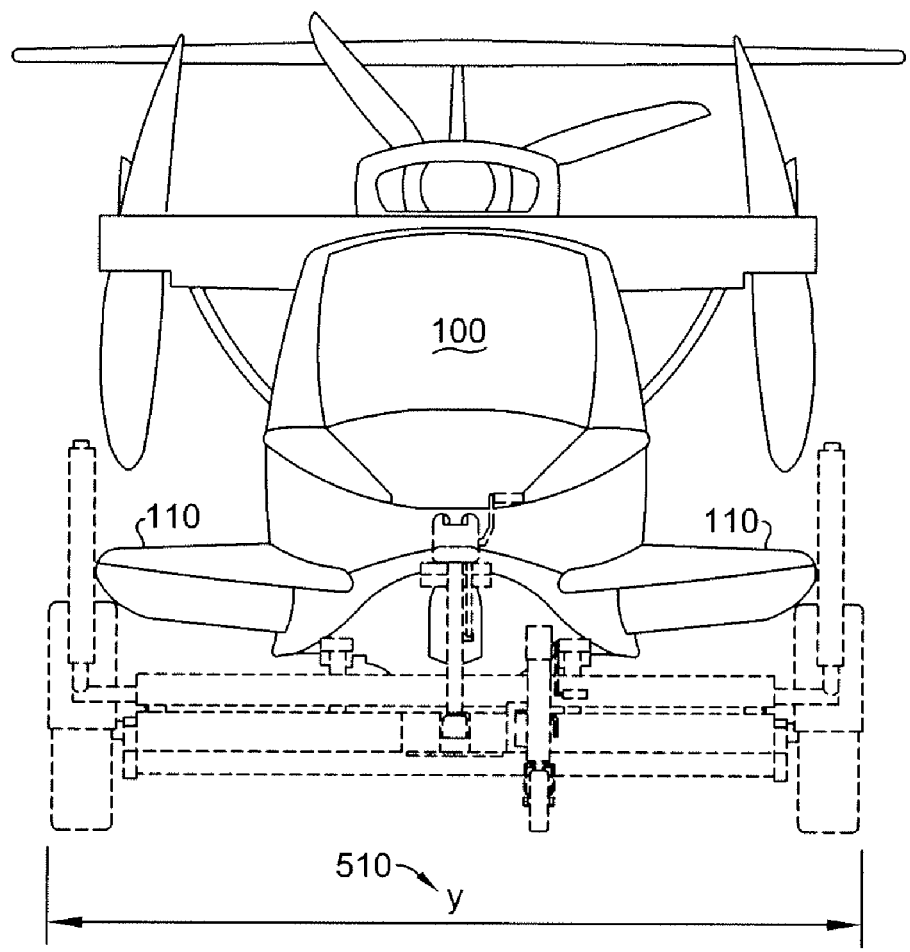
FIG. 5 shows a front view of an amphibious aircraft utilizing one embodiment of the lateral stability system of the present invention in combination with a trailer.

According to another embodiment of the present invention, an amphibious aircraft can have enhanced lateral stability for operations on the water while maintaining the ability to be transported on a trailer. FIG. 5 shows a front view of an amphibious aircraft with a lateral stability system of the present invention configured for transport on a trailer. The amphibious aircraft 100 includes the buoyancy system 110 and wingtip system 120 as previously discussed. The hydrodynamic wingtips 120 (not shown) and the associated wing are shown in their stored position. In the present depiction the aircraft 100 rests on the trailer 510 having a lateral width of the dimension Y 520. The combination of the hydrodynamic planing surface 120 of each wingtip and the buoyancy system 110 of the lateral stability system enable the amphibious aircraft to achieve a stored configuration of minimal width. In one embodiment the width of the trailer 510 combined with the aircraft 100 is less than the legal limit for transportation on public highways. While the maximum lateral width of a trailer being towed on public roads varies, the present invention enables a trailer transporting an amphibious aircraft with a lateral stability system to have a maximum lateral width of 9 feet or less. In another embodiment the maximum lateral width Y 520 of the aircraft in its stored configuration in combination with its trailer is less than or equal to 8 feet, 6 inches. In yet another embodiment of the present invention the maximum lateral width of the aircraft in its stored configuration is less than or equal to 7 feet, 6 inches. Such an ability to minimize the lateral width of the aircraft while maintaining its operational lateral stability gives the amphibious aircraft not only the ability to be transported on public roads via a trailer but to be shipped via a standard shipping container.

Described herein are various embodiments of a lateral stability system for a transportable amphibious aircraft. The lateral stability system of the present invention includes a buoyancy system comprising opposing buoyancy structures located on either side of the fuselage of an amphibious aircraft. Supplementing the buoyancy structures of the buoyancy system are wingtip hydrodynamic planing surfaces. Used in conjunction with the buoyancy structures the hydrodynamic planing surfaces associated with each wingtip prevent the buoyancy structures of the buoyancy system from becoming submerged as may occur during a turn or when experiencing crosswind conditions. By preventing submersion of the buoyancy structure the amphibious aircraft can continue to accelerate until the ailerons can produce a sufficient lifting force to control lateral stability.

By supplementing the lateral stability of the buoyancy structures using hydrodynamic planing surfaces associated with the wingtip, the combined lateral width of the fuselage and buoyancy structures can be reduced without detrimentally impacting operational performance. This reduced lateral width enables the amphibious aircraft to be configured for storage and transportation on a trailer or in a container. According to one embodiment of the present invention the combined width of the trailer and amphibious aircraft, when it is in its stored configuration, is less than the maximum allowable width allowed on the public highways. Furthermore the amphibious aircraft can be configured to be transported via a shipping container without detrimentally impacting its operational performance.

While there have been described above the principles of the present invention in conjunction with a lateral stability system, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for enhancing lateral stability of an amphibious aircraft on a body of water, the method comprising;
    displacing a buoyancy system laterally from a fuselage of the amphibious aircraft sufficient to maintain static lateral stability wherein the buoyancy system includes a hydrodynamic step; and
    responsive to a wingtip of the amphibious aircraft engaging the body of water while the amphibious aircraft is in motion, producing a dynamically increasing righting force augmenting lateral stability of the amphibious aircraft.

2. The method for enhancing lateral stability according to claim 1 wherein the dynamically increasing righting force opposes a submersion force associated with the buoyancy system when at least a portion of the buoyancy system is submerged.

3. The method for enhancing lateral stability according to claim 1 wherein the wingtip possesses a tip dihedral orientation and a positive angle of incidence such that upon contact with the body of water at least one hydrodynamic planing surface of the wingtip is substantially parallel with the body of water.

4. The method for enhancing lateral stability according to claim 1 wherein the wingtip is an anhedral wingtip possessing a tip dihedral orientation with a hydrodynamic planing surface such that upon interaction with the body of water the hydrodynamic planing surface is substantially parallel with a water surface of the body of water.

5. The method for enhancing lateral stability according to claim 1 wherein the dynamically increasing righting force is substantially perpendicular to the body of water.

6. The method for enhancing lateral stability according to claim 1 wherein interaction between the buoyancy system and the wingtip provides dynamic lateral stability.

7. The method for enhancing lateral stability according to claim 1 wherein the wingtip is located at each of opposite ends of a polyhedral wing.

8. A method for dynamic lateral stability of an amphibious aircraft, comprising;
providing by a buoyancy system having a hydrodynamic step laterally displaced from a fuselage of the amphibious aircraft static lateral stability; and
responsive to a wingtip located at each end of a polyhedral wing of the amphibious aircraft interacting with a surface of a body of water while the amphibious aircraft is in motion, creating a dynamically increasing righting force substantially perpendicular to the surface of the body of water sufficient to provide dynamic lateral stability.

9. The method for dynamic lateral stability of claim 8 wherein the wingtip is an anhedral wingtip possessing a tip dihedral orientation.

10. The method for dynamic lateral stability of claim 9 wherein the wingtip includes a hydrodynamic planing surface with a positive angle of incidence.

11. The method for dynamic lateral stability of claim 10 wherein the dynamically increasing righting force is proportional to displacement of the hydrodynamic planing surface and speed of the amphibious aircraft.

12. A method for dynamically stabilizing an amphibious aircraft by augmenting lateral stability of a buoyancy system laterally displaced from a fuselage of the amphibious aircraft wherein augmenting includes forming a righting force substantially perpendicular to a surface of a body of water at a wingtip of the amphibious aircraft, the righting force being proportional to speed of the amphibious aircraft and displacement of the wingtip in the body of water.

13. The method for dynamically stabilizing an amphibious aircraft of claim 12 wherein interaction between the buoyancy system and wingtip makes the amphibious aircraft laterally stable while the amphibious aircraft is in motion.

14. The method for dynamically stabilizing an amphibious aircraft of claim 12 wherein the wingtip has an anhedral configuration and is associated with a polyhedral wing, the wingtip further possessing a positive angle of incidence with at least one hydrodynamic planing surface.

15. The method for dynamically stabilizing an amphibious aircraft of claim 14 wherein the at least one hydrodynamic planing surface includes a tip dihedral orientation such that upon rolling of the amphibious aircraft sufficient for the wingtip to make contact with the body of water the at least one hydrodynamic planing surface is substantially parallel with body of water.

16. A stability system for an amphibious, the system comprising:
a sponson laterally displaced from a fuselage of the amphibious aircraft wherein the sponson includes a hydrodynamic step; and
a planning surface on each wingtip of a polyhedral wing wherein interaction between the sponson and the planning surface is operable to provide static and dynamic waterborne stability.

17. The stability system of claim 16 wherein the sponson is operable to provide static stability.

18. The stability system of claim 16 wherein the planning surface augments dynamic stability.

19. The stability system of claim 16 wherein upon the planning surface contacting a water surface the planning surface is substantially parallel with the water surface.

20. The stability system of claim 19 wherein the planning surface includes a hydrodynamic step.

21. The stability system of claim 19 wherein increased dynamic submersion downward force of the planning surface results in a proportional opposite increase in an righting force.

22. The stability system of claim 19 wherein the planning surface includes a positive angle of inclination upon interaction with the water surface.

23. The stability system of claim 19 wherein interaction of the planning surface with a water surface prevents submersion of the sponson.

24. A dynamic lateral stability system for an amphibious aircraft, comprising:
a planning surface positioned at each wingtip of a polyhedral wing wherein interaction of the planning surface with a water surface while the amphibious aircraft is in motion supplements lateral stability of a laterally displaced sponson, the laterally displaced sponson being associated with a fuselage of the amphibious aircraft and having a hydrodynamic step.

25. The dynamic lateral stability system of claim 24 wherein the planning surface and the laterally displaced sponson interact to provide dynamic and static stability for the amphibious aircraft during substantially all waterborne operations.

26. The dynamic lateral stability system of claim 24 wherein the planning surface includes a hydrodynamic step.

27. The dynamic lateral stability system of claim 24 wherein responsive to a lateral displacement of the amphibious aircraft resulting in contact of one of the wingtips with the water surface, the planning surface interface with the water surface is substantially laterally parallel with a positive longitudinal inclination.

28. The dynamic lateral stability system of claim 24 wherein interaction of the planning surface with the water surface creates a righting force substantially perpendicular to the water surface.

29. The dynamic lateral stability system of claim 24 wherein a leading edge of the planning surface possesses a positive inclination with respect to the trailing edge of the planning surface.

* * * * *